United States Patent
Goldman et al.

[11] Patent Number: 6,025,018
[45] Date of Patent: Feb. 15, 2000

[54] METHOD AND APPARATUS FOR MAKING WIRE MESH PREFORM

[75] Inventors: Dov Goldman, Secaucus; Kurry Brian Emmons, Neshanic Station; Peter P. Usher, Union, all of N.J.

[73] Assignee: Metex Mfg. Corporation, Edison, N.J.

[21] Appl. No.: 08/823,927

[22] Filed: Mar. 25, 1997

[51] Int. Cl.$^7$ ........................................................ B05D 3/12
[52] U.S. Cl. ........................... 427/178; 427/289; 427/356; 427/434.2; 427/434.4; 118/419
[58] Field of Search ............................ 427/434.4, 434.2, 427/356, 289, 178; 118/419

[56] References Cited

U.S. PATENT DOCUMENTS

| | | | |
|---|---|---|---|
| 1,489,076 | 4/1924 | Harter | 427/434.2 |
| 1,942,703 | 1/1934 | Hubbard et al. | |
| 2,269,169 | 1/1942 | Derhoef et al. | 118/419 |
| 2,457,694 | 12/1948 | Lippincott . | |
| 2,520,089 | 8/1950 | Lippincott . | |
| 2,674,644 | 4/1954 | Goodloe . | |
| 2,676,823 | 4/1954 | Olson et al. . | |
| 2,882,083 | 4/1959 | Palumbo et al. . | |
| 3,117,795 | 1/1964 | Price . | |
| 3,238,058 | 3/1966 | Jeannin . | |
| 3,336,035 | 8/1967 | Price . | |
| 3,573,873 | 4/1971 | Pearson . | |
| 3,815,927 | 6/1974 | Geipel | 277/180 |
| 3,905,090 | 9/1975 | Painter | 29/455 |
| 4,019,244 | 4/1977 | Owen et al. | 29/520 |
| 4,180,211 | 12/1979 | Olcott et al. | 239/265.43 |
| 4,189,819 | 2/1980 | Nicholson | 29/417 |
| 4,203,191 | 5/1980 | Gibson, Sr. | 29/451 |
| 4,271,228 | 6/1981 | Foster et al. | 428/281 |
| 4,361,335 | 11/1982 | Vinciguerra | 277/204 |
| 4,417,733 | 11/1983 | Usher | 277/1 |
| 4,462,603 | 7/1984 | Usher et al. | 277/230 |
| 4,477,094 | 10/1984 | Yamamoto et al. | 277/235 B |
| 4,516,782 | 5/1985 | Usher | 277/1 |
| 4,530,874 | 7/1985 | Hendrix et al. | 428/266 |
| 4,559,248 | 12/1985 | Sumiyoshi et al. | 428/36 |
| 4,559,249 | 12/1985 | Arigaya et al. | 428/36 |
| 4,601,476 | 7/1986 | Usher et al. | 277/230 |
| 4,629,199 | 12/1986 | Yamamoto et al. | 277/204 |
| 4,673,187 | 6/1987 | Hanson et al. | 277/314 |
| 4,737,383 | 4/1988 | Matsumae | 118/419 |
| 4,762,330 | 8/1988 | Lonne et al. | 277/230 |
| 4,931,326 | 6/1990 | Weil | 428/35.8 |
| 4,951,954 | 8/1990 | MacNeill | 277/230 |
| 4,955,218 | 9/1990 | Brandener | 72/146 |
| 5,040,805 | 8/1991 | Ozora | 277/235 R |
| 5,065,493 | 11/1991 | Ozora | 29/505 |
| 5,082,296 | 1/1992 | Aizawa et al. | 277/204 |
| 5,161,807 | 11/1992 | Allen et al. | 277/204 |
| 5,275,423 | 1/1994 | Allen et al. | 277/180 |
| 5,308,090 | 5/1994 | Hamada et al. | 277/204 |
| 5,411,274 | 5/1995 | Yahagi et al. | 277/203 |
| 5,451,064 | 9/1995 | Mercuri et al. | 277/196 |
| 5,462,291 | 10/1995 | Maeda et al. | 277/100 |
| 5,499,825 | 3/1996 | Maeda et al. | 277/100 |
| 5,527,047 | 6/1996 | Waterland, III | 277/204 |
| 5,609,344 | 3/1997 | Tamaoki et al. | 277/157 |
| 5,645,284 | 7/1997 | Fitton | 277/204 |
| 5,669,613 | 9/1997 | Lubienski | 277/204 |
| 5,683,091 | 11/1997 | Isoe et al. | 277/203 |

FOREIGN PATENT DOCUMENTS

| | | |
|---|---|---|
| 403177660 | 8/1991 | Japan . |
| 2159588A | 12/1985 | United Kingdom . |

*Primary Examiner*—Janyce Bell
*Attorney, Agent, or Firm*—John G. Gilfillan, III; William Squire

[57] ABSTRACT

A flattened tubular knitted wire mesh is passed through a bath of a slurry comprising a vermiculite binder and a high temperature lubricant powder with optional metal fibers suspended in water to form an impregnated moving slurry filled web. The slurry filled web is passed between metering bars to remove excess slurry to reduce the web to the desired thickness and then dried in an oven at a temperature in the range of about 200–400° F. The web is conveyed at about 5 feet/minute and forms a continuous sheet of flexible preform with a dried filler which is wound on a take up roller driven by a motor via a controller which also operates the web drying oven. The preform is then formed into discrete preforms for article manufacture such as seals and the like by conventional die compression.

24 Claims, 1 Drawing Sheet

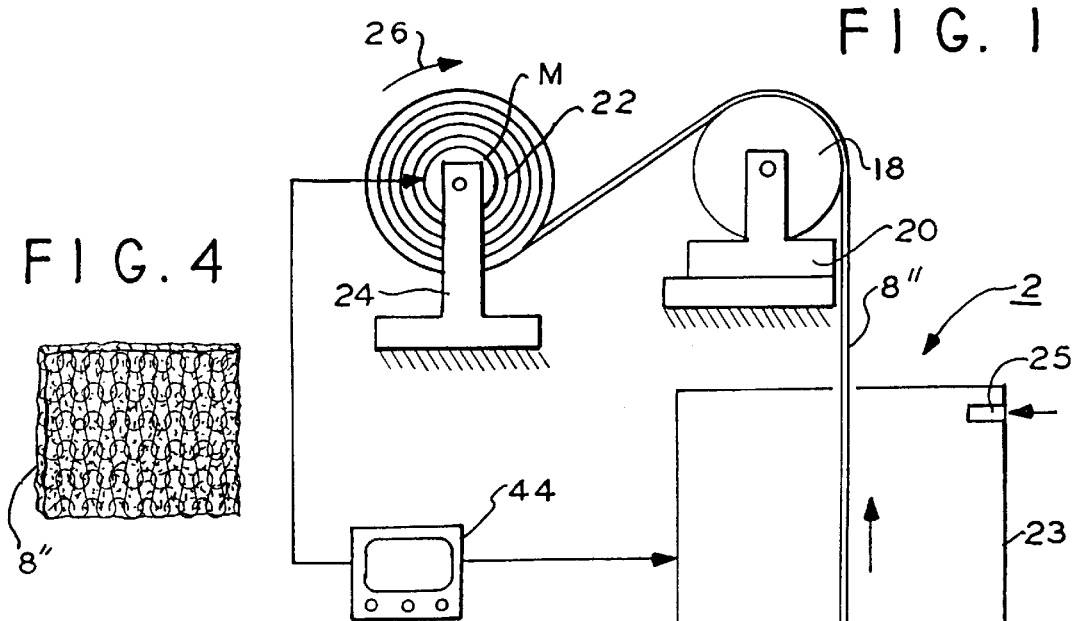
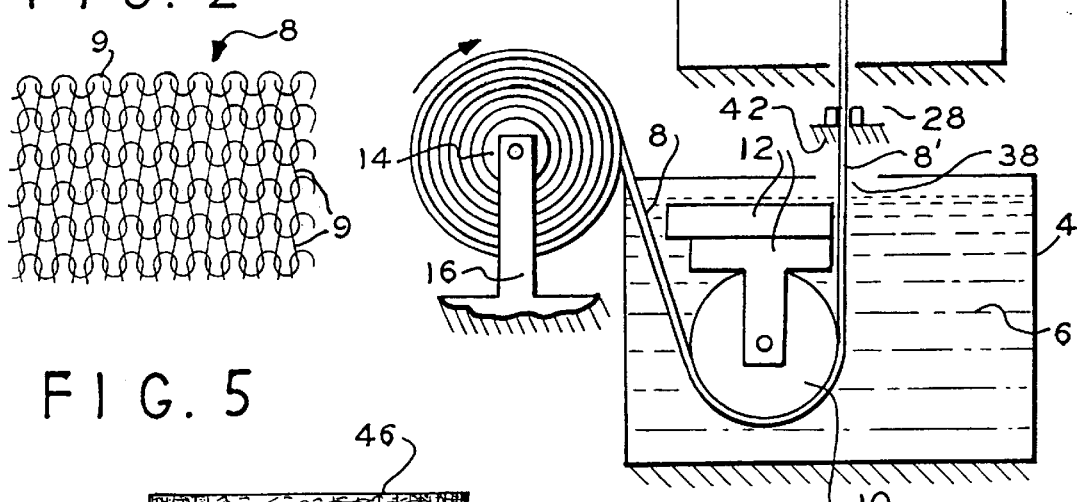
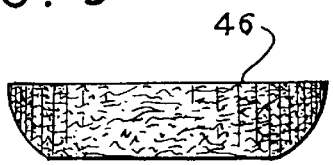
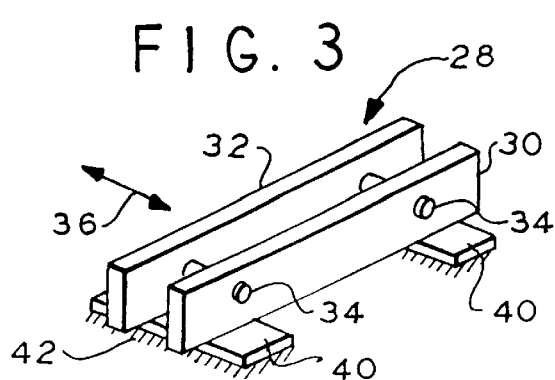
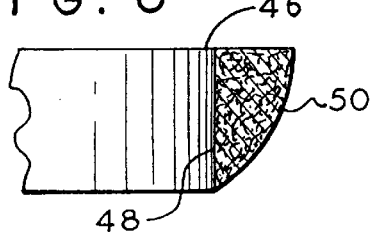

METHOD AND APPARATUS FOR MAKING WIRE MESH PREFORM

This invention relates to a method of making preforms comprising knitted wire mesh and a filler material typically utilized to fabricate seals for automotive exhaust systems.

Of interest is commonly owned copending application Ser. No. 716,661 entitled Pipe Joint and Seal Therefor filed Sep. 10, 1996 in the name of Kurry Brian Emmons et al, now U.S. Pat. No. 5,683,119.

Knitted wire mesh comprises generally fine stainless steel wire knitted into an endless tubular web. For example, U.S. Pat. No. 5,499,825, incorporated by reference herein, discloses such a web. As disclosed, the web is then flattened between rollers, for example, A heat resistant sheet material is superimposed with the web and convoluted into a cylinder with the heat resistant material located at the inner and outermost periphery of the cylinder.

A separate heat resistant sheet material is prepared. an aqueous dispersion containing a lubricating composition of boron nitride and alumina or silica containing polytetrafluorolethylene is applied to one surface of the heat resistant material by brushing, spraying and then dried to form a coating. The sheet material is then inserted into the belt shaped metal wire mesh and rolled to form a flattened member. A cylindrical preform is then formed of the member by winding about the cylinder previously formed. The resulting structure is then compressed in a die to form the final article. The brushing and spraying of the aqueous dispersion is batch oriented, labor intensive and costly.

U.S. Pat. No. 5,462,291, incorporated by reference herein, discloses similar subject matter wherein a reinforcing member comprising knitted wire mesh is formed. A preform is formed by placing the reinforcing member in a die and covering the member with a mixture comprising metal fibers, a solid lubricant and a synthetic resin binder. The resulting structure is then compressed in the die to form an article such as a seal. The aqueous dispersion of the lubricating composition is applied by brushing, spraying and so on to provide a coating on the outer surface of the preform.

U.S. Pat. No. 4,462,603, incorporated by reference herein, discloses fabrication of knitted wire mesh exhaust seals with a refractory metallic oxide impregnant. A refractory metallic oxide is suspended in water or volatile solvent with a resin binder and wetting agents to form an impregnate to a compressed knitted wire mesh structure. One or more impregnating operations are used to fill the voids in the mesh. The voids are filled by soaking or by otherwise forcing the impregnating liquid into the voids. The knitted mesh and oxide are then dried. This too is a batch labor intensive process and is costly to implement.

Still other seals and corresponding preforms are fabricated utilizing other techniques as disclosed in U.S. Pat. Nos. 4,516,782, 4,601,476, 4,417,733 and 4,559,249, all incorporated by reference herein. In the '782 patent a seal is formed by constructing a cylindrical preform which includes a refractory material in flexible sheet form and wire mesh. The preform is axially compressed to form the finished product. The refractory material and mesh are compressed together in a convoluted cylindrical shape to form a seal. In the '476 patent, the wire mesh and filler material are placed in the die cavity and then compressed.

The present inventors recognize a need for an automated system for fabricating preforms useful for the manufacture of articles such as automotive exhaust seals and others to minimize cost and to provide consistency in product parameters. For example, batch labor intensive processes tend to exhibit variations from batch to batch which need to be controlled and which control adds to the cost of fabrication.

A method of making a wire mesh preform according to the present invention comprises moving a web of knitted wire mesh having a plurality of interstices from a supply reel to a take up reel through a binder slurry to fill the interstices with the slurry; and drying the slurry filled moving web prior to the take up reel to produce a dry flexible preform comprising a mesh substantially filled with a dry solid binder.

In one aspect, the method further includes severing the dry flexible preform web into a plurality of discrete preforms.

In a further aspect, the moving step includes passing the web into a bath of the slurry and moving the slurry filled web substantially vertically from the bath.

In a still further aspect, the method includes removing excess slurry from the moving web as the slurry filled web exits the bath.

The removing excess slurry may include passing the slurry filled web between two spaced metering members for removing the excess slurry simultaneously from opposing sides of the moving web.

Additionally, the method may include automatically returning the excess slurry to the bath.

The method in a further aspect includes heating the moving slurry filled web to evaporate liquid from the slurry.

The heating step includes passing the slurry filled web through an air heated furnace.

In a further aspect, the slurry comprises a refractory lubricant powder, metallic fibers and a binder powder suspended in a liquid and in one embodiment, the liquid is water.

The heating is preferably in the range of about 250° to 400° F.

The preform preferably comprises a mesh in the range of about 2 to 3 inches wide of about 5 to 10 cpi steel wire and containing about 10–30 g of dry filler per foot.

The refractory lubricant powder for the slurry is preferably selected from the group consisting of a nitride, graphite, a fluoride and a phosphide and the metallic fibers are preferably selected from the group consisting of carbon steel, carbon and stainless steel.

An apparatus for making a wire mesh preform according to the present invention comprises means for moving a web of knitted wire mesh having a plurality of interstices from a supply reel to a take up reel through a binder slurry to fill the interstices with the slurry and means for drying the slurry filled moving web prior to the take up reel to produce a dry flexible preform comprising a mesh substantially filled with a dry solid binder.

IN THE DRAWING

FIG. 1 is a diagrammatic partially in section side elevation view of an apparatus for practicing the method of the present invention;

FIG. 2 is a more detailed view of knitted wire mesh used in the embodiment of FIG. 1;

FIG. 3 is an isometric view of a device for removing excess slurry from the moving web of FIG. 1;

FIG. 4 is an isometric view of a portion of the web of FIG. 1;

FIG. 5 is a side elevation view of a seal formed with a precut segment of the preform formed by the apparatus of FIG. 1; and FIG. 6 is a partial sectional view of the seal of FIG. 5.

In FIG. 1, apparatus 2 comprises a tank 4 containing a liquid slurry 6 of a lubricating binder 8 to be impregnated into the interstices of a knitted wire mesh web 8 to form an impregnated web 8'. Located within the tank 4 and within the slurry 6 is an idler roller 10 rotatably mounted in fixed position to the tank by supports 12. The supports 12 are secured to the tank 4. The web 8 is guided in the slurry filled tank by the roller 10 which may have a guide channel (not shown) for guiding the web 8 in the tank 4. Roller 10 may be fabricated of any suitable material and preferably steel.

A supply roller 14 has wrapped thereabout a spiral reel of knitted wire mesh web 8. The web 8 is conventional and preferably is formed of fine stainless steel wire, e.g., 0.008–0.011 mm diameter. The web is formed as a tube and flattened in a known way as disclosed in certain of the aforementioned patents incorporated by reference herein. The tube may be formed on a knitting machine employing any number of needles as desired, e.g., 28 and 38 needles in certain embodiments. In certain embodiments, the web 8 may be between 1–10 inches wide (25 mm–254 mm) and in the range of about 5–10 cpi (courses per inch—stitches per inch along the knitted tube length). In FIG. 2, the web 8 comprises wires 9 interlocked in knitted fashion. The formed tube is endless and after it is flattened in a manner not shown herein, but disclosed in certain of the aforementioned patents, it is wrapped about rollers such as roller 14 for subsequent processing.

Roller 14 is rotatably mounted on a support 16 via bearings (not shown). Roller 14 is free to rotate in response to a pulling load on the web 8. A resistance device (not shown) may be provided roller 14 to prevent undesirable acceleration of roller 14 as the web 8 is deployed therefrom.

The moving slurry filled web 8' is continuously passed through an oven 23, preferably electrically heated. The oven is maintained at a temperature for air drying the slurry on the web 8' to form a dried binder filled preform web 8". The oven 23 receives filtered air through an inlet 25. The air in the oven is heated by heaters (not shown) and is exhausted (by means not shown) through an exhaust vent (not shown). Preferably, the wet slurry is dried in the oven 23 at a temperature which may lie in the range of 200° to 400° F. The slurry is dried at a particular predetermined temperature in this range for a given slurry composition and web feed rate. The resulting dried slurry forms a hard, but flexible filler for the wire mesh of web 8 forming the web 8" into a moving flexible sheet.

The moving web 8' with the wet slurry filled interstices is continuously passed through a metering device 28 prior to the oven 23 for removing excess slurry from the wire mesh exiting from the tank 4. The device 28, FIG. 3, comprises a pair of spaced planar rectangular bars 30, 32, preferably steel, but may be other materials. The bars are manually adjustably secured to each other by screws 34 for displacement in directions 36 toward and away from each other in translation with the bars preferably parallel to each other. The spacing between the bars 30, 32 is set to provide a desired thickness to the slurry on the web 8'. The excess slurry is wiped from the surface of the web 8' forming the web into a planar sheet of continuously moving slurry filled mesh 8'. The excess slurry 6 is returned to the tank 4 through opening 38.

The bars 30, 32 are supported on supports 40 attached to the tank 4 or other support structure (not shown) as represented by symbols 42. The bars 30, 32 are illustrated as being manually adjustable. In the alternative, the spacing of the bars may be electrically controllable if desired by a controller (not shown). The thickness of the final dry web 8" is uniform and controlled by the device 28. By way of example the wet slurry filled web 8' may have a thickness of about 3 mm and the dry binder filled mesh web 8" exiting the oven 23 may have a thickness of about 1 mm.

A second idler roller 18, which may also have a web guiding channel (not shown), is rotatable secured to support 20 for guiding the dried slurry filled flexible wire mesh web 8". A take up roller 22 is rotatably secured to support 24 for receiving the flexible web 8". A motor M secured to support 24 rotatably drives the roller 22 in direction 26 for wrapping the web 8" thereabout.

A controller 44 controls the operation of the oven 23 and the motor M. The controller 44 sets the oven temperature, and according to a given implementation, the air flow rate through the oven 23 and provides power to drive the motor M. Preferably the motor M drives the roller 22 at a fixed web moving velocity. Thus, the speed of the roller 22 may be varied as the web builds up on the roller to maintain the web speed constant. The speed is set by the controller 44. Controller 44 may be a hardwired device or may be a computer operated device according to a given implementation.

The web 8' is displaced preferably vertically through the device 28 and oven 23 at a preferred constant feed rate of about 1–7 feet/min. and preferably about 5 feet/min. The vertical orientation enhances uniformity of the slurry 6 thickness on the web 8' until the slurry is dried. In a vertical orientation, the slurry tends to flow vertically downwardly along the web interstices, according to its viscosity, assisting in maintaining uniformity of thickness after the web passes through the metering device 28.

The slurry 6 is a composite comprising a suitable liquid such as preferably water or alcohol in which the slurry components are dispersed and suspended. Water is preferred and may be 60–70% by weight in a preferred slurry, but may lie in a range of about 50–75%. The amount of liquid is selected in accordance with the desired viscosity of the slurry to insure the interstices of the mesh of the web 8 remain uniformly filled as the web dries.

The slurry 6 includes a combination of high temperature lubricant powder, e.g., capable of withstanding about 500–1000° C., such as nitrides, fluorides and phosphides, e.g., calcium fluoride and boron nitride, and carbon such as graphite. Short metal fibers of copper and/or carbon steel, preferably about 3 mm long and about 0.1–0.2 mm diameter are dispersed in the slurry. The fibers may be commercially available steel wool chopped and may have random lengths approximately in the range of up to about 3 mmm and may be as small as about 200 mesh size. The amount of fibers used is for matching the coefficient of expansion of the resulting preform 8" to the desired end product, such as a seal or other device, and in particular, an articulating joint thereof. The copper has a greater coefficient of expansion than the steel and is used to set the thermal expansion coefficient of the preform by setting the proportions thereof accordingly.

For example, the volume of copper fibers may be one half the volume of steel fibers for a given implementation. In other implementations there may be 100% copper or 100% steel as needed. The copper fibers may be in a range preferably of 3–20% by weight and the carbon steel fibers may be in a range of about 7–25% by weight in the resulting slurry for fabricating exhaust seals from the resulting preform.

In addition, the slurry 6 includes a binder powder such as fine vermiculite. The vermiculite is preferably about 5–15% by weight. The resulting composition has a composition wherein the desired slurry to mesh ratio is maintained to completely fill the interstices of the mesh 8.

The filler material composition forming the slurry is selected from that combination of materials needed to minimize reaction between the surface of a resulting seal articulated joint and the surface of the sliding sealing member. For metallic joints made of iron or nickel base alloys, the slurry 6 composition is selected from a family of refractory non-oxide powders such as the nitrides, fluorides and phosphides noted above. In particular, BN (boron nitride) or fluorinated mica are preferred for this application. One or more of high temperature lubricants may be added to the filler, e.g., fluorides of Ca or graphite flake. To compensate for possible shrinkage of the material, the addition of the metal fibers noted above which will oxidize in the presence of oxygen and increase the volume are added. The metal fibers also dissipate the heat from the refractory mix. The vermiculite is added to preserve the integrity of the mix. Fine vermiculite forms a binder and is available as Microlite, a product of the W.R. Grace Corporation, and is added in the range of about 5–10% by weight.

The following are examples of two preform webs fabricated in accordance with the principles of the present invention.

EXAMPLE 1

304 stainless steel 0.011 inch diameter wire was knitted into a tubular mesh employing 28 needles. The tube of mesh was flattened into a 2⅛ inch wide web, 10 cpi forming a continuous wire web mesh. A slurry was formed of fine vermiculite, boron nitride, calcium fluoride, carbon steel and copper fibers suspended in water as follows by weight percent.

- carbon steel fibers-8% (0.2 mm diam. and 1.5 mm approximate average length)
- fine vermiculite—7%
- boron nitride—5%
- calcium fluoride—7%
- copper fiber—9% (0.2 mm diam. and 1.5 mm approximate average length)
- water—64%

The resulting slurry was formed and the mesh was pulled through the slurry vertically by the apparatus 2 of FIG. 1 at a speed of 5 feet/min. with the oven at 400° F. for a period of 2 minutes in the oven (oven about 10 feet in length). The resulting preform web was flexible and contained about 10 g of dry filler per foot of web.

EXAMPLE 2

304 stainless steel 0.008 inch diameter wire was knitted into a tubular mesh employing 38 needles. The tube of mesh was flattened into a 2.75 inch wide web, 5.5 cpi forming a continuous wire web mesh. A slurry was formed of fine vermiculite, graphite powder, calcium fluoride suspended in water as follows by weight per cent.

- fine vermiculite—13%
- graphite powder—10%
- calcium fluoride—7%
- water—70%

The resulting slurry was formed and the mesh was pulled through the slurry vertically by apparatus 2 of FIG. 1 at a speed of 2 feet/min. with the oven at 250° F for a period of 5 minutes in the oven (oven length 10 feet). The resulting preform web was flexible and contained about 30 g of dry filler per foot of web.

In FIGS. 5 and 6, the resulting preform on take up roll 22 is then cut into discrete preforms of desired dimensions for formation into the desired product, a seal 46. The seal 46 is fabricated by winding the preform about a mandrel in a die (not shown). The wound preform is then compressed as shown in certain of the aforementioned patents. The seal 46 is formed with a bore 48 and a spherical outer surface 50.

It will occur to one of ordinary skill that various modifications may be made to the disclosed embodiments. It is intended that the description be provided by way of illustration and not limitation. The scope of the invention is as defined by the appended claims.

What is claimed is:

1. A method of making a wire mesh preform comprising:
   moving a web of knitted wire mesh having a plurality of interstices from a supply reel to a take up reel through a binder slurry to fill the interstices with the slurry; and
   drying the slurry filled moving web prior to the take up reel to produce a dry flexible preform comprising a mesh substantially filled with a dry solid binder.

2. The method of claim 1 including severing the dry flexible preform web into a plurality of discrete preforms.

3. The method of claim 2 including forming an article of manufacture from a discrete preform.

4. The method of claim 1 wherein said moving step includes passing the web into a bath of said slurry and moving the slurry filled web substantially vertically from the bath.

5. The method of claim 4 including removing excess slurry from said moving web as the slurry filled web exits said bath.

6. The method of claim 5 wherein said removing excess slurry includes passing the slurry filled web between two spaced metering members for removing said excess slurry simultaneously from opposing sides of said moving web.

7. The method of claim 6 including automatically returning the excess slurry to said bath.

8. The method of claim 1 wherein the drying includes heating the moving slurry filled web to evaporate liquid from said slurry.

9. The method of claim 8 wherein said heating step includes passing the slurry filled web through an air heated furnace.

10. The method of claim 8 wherein said heating is in the range of about 250° to 400° F.

11. The method of claim 1 wherein the slurry comprises a refractory lubricant powder, metallic fibers and a binder powder suspended in a liquid.

12. The method of claim 11 wherein the liquid is water.

13. The method of claim 11 wherein the refractory lubricant powder is selected from the group consisting of a nitride, graphite, a fluoride and a phosphide and the metallic fibers are selected from the group consisting of carbon steel, carbon and stainless steel.

14. The method of claim 13 wherein the fibers have a length of about 3 mm and a diameter of about 0.1 to about 0.3 mm.

15. The method of claim 13 wherein the binder powder includes vermiculite.

16. The method of claim 11 wherein the slurry comprises water in the range of 50–80% by weight, copper fibers in the range of 0–20% by weight, calcium fluoride in the range of 4–16% by weight, carbon steel fibers in the range of 0–25% by weight and vermiculite in the range of about 5–10% by weight.

17. The method of claim 1 wherein the preform comprises a mesh in the range of about 1 to 10 inches wide of about 5 to 10 cpi steel wire and containing about 10–30 g of dry filler per foot.

18. The method of claim 1 wherein said web is moved at a rate of about 1 to 7 feet (0.3 to 2.1 m) per minute.

19. An apparatus for making a wire mesh preform comprising:
   means for moving a web of knitted wire mesh having a plurality of interstices from a supply reel to a take up reel through a binder slurry to fill the interstices with the slurry; and
   means for drying the slurry filled moving web prior to the take up reel to produce a dry flexible preform comprising a mesh substantially filled with a dry solid binder.

20. The apparatus of claim 19 further including a pair of spaced metering members for removing excess slurry simultaneously from opposing sides of said moving web.

21. The apparatus of claim 19 including means for moving said web at a rate of about 1 to 7 feet (0.3 to 2.1 m) per minute.

22. The apparatus of claim 19 wherein said means for moving the web includes means for moving the web substantially vertically during said drying.

23. The apparatus of claim 19 wherein the means for moving comprises a tank for storing said binder slurry and including an idler roller in said tank for guiding said moving web through said tank.

24. The apparatus of claim 19 wherein the means for moving includes a tank containing said slurry and means for moving the web in and out of the tank in substantially vertical directions.

* * * * *